United States Patent
Olsson

[15] 3,664,879
[45] May 23, 1972

[54] VENT PLUG FOR A FILLING OPENING OF A CELL OF AN ELECTRIC STORAGE BATTERY

[72] Inventor: Bertil Lennart Olsson, Hallstorpsvagen 6, 212 32 Malmo, Sweden

[22] Filed: Aug. 24, 1970

[21] Appl. No.: 66,495

[30] Foreign Application Priority Data

Sept. 12, 1969 Sweden.............................12,556/69

[52] U.S. Cl.................................................136/182, 73/327
[51] Int. Cl....................................H01m 7/00, H01m 45/06
[58] Field of Search....................136/162, 177, 182; 73/327

[56] References Cited

UNITED STATES PATENTS

| | | |
|---|---|---|
| 2,123,479 | 7/1938 | Spencer..................................136/177 |
| 3,528,291 | 9/1970 | Melone....................................73/327 |
| 1,938,988 | 12/1933 | Wallace..................................136/162 |
| 2,627,748 | 2/1953 | Maybach et al. .........................73/327 |
| 3,434,513 | 3/1969 | O'Bannon..............................136/162 |

Primary Examiner—Donald L. Walton
Attorney—Laurence R. Brown

[57] ABSTRACT

A vent plug for an automobile type battery is provided with both a means to add electrolyte without removing the plug and a light transmitting rod that is immersed in the electrolyte to show the proper level without removing the vent plug as the filling progresses.

1 Claims, 1 Drawing Figure

Patented May 23, 1972
3,664,879
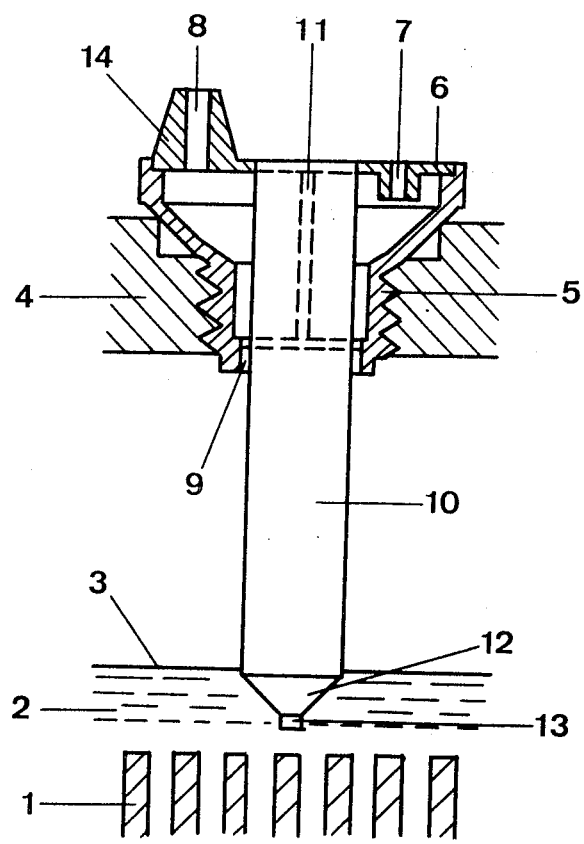
INVENTOR.
Bertil L. Olsson
BY
Laurence R. Brown
Attorney

VENT PLUG FOR A FILLING OPENING OF A CELL OF AN ELECTRIC STORAGE BATTERY

This invention relates to a vent plug for a filling opening of a cell of an electric storage battery and of the kind which is provided with an indicator for indicating the relative level of electrolyte in the cell.

Many batteries are used in cars and are placed so that they are rather difficult to inspect. Even if the battery might be easily accessible many car owners refrain from touching the battery—especially the vent plugs.

The object of the present invention is to provide a vent plug which can give a direct indication of the right electrolyte level being obtained, i.e., it does not necessitate the cycle of operations consisting of removing the plug, the filling, the checking of the level, and the reinserting of the plug.

According to the present invention this is obtained thereby that the said vent plug comprises two separate channels leading from the outside of the battery to the interior of the cell.

The invention will be described in more detail reference being made to the accompanying drawing showing a vertical section through the upper part of an electric storage battery provided with a vent plug according to the invention.

The battery shown comprises a number of lead plates 1 immersed in electrolyte 2 the surface level of which is designated as 3. A cover 4 is provided with a threaded filling opening into which the vent plug according to the invention is screwed.

The vent plug consists of a threaded housing 5 made of non-transparent material. A cover 6 having diametrically opposite openings 7 and 8 is fitted at the top of the housing 5 and is also made of a non-transparent material. The housing 5 is provided with a number of openings 9. A rod 10 of generally cylindrical shape and made of a transparent material such as polystyrene is fitted in corresponding axial openings in the housing 5 and the cover 6. The housing 5 also comprises two vertically extending walls 11—shown in dotted lines—at opposite sides of the rod 10. The lower end of the rod 10 is conical the angle of the cone surface 12 relative the vertical direction being about 45°. However, the lowermost portion 13 of the rod 10 being cylindrical and terminating in a horizontal surface.

The device described will function as follows:

In case the level 3 of the electrolyte is above the cone 12 as shown in the drawing, all light being transmitted into the battery cell through the rod 10 will be passed into the electrolyte and no light will be reflected. Thus the upper end surface of the rod 10 will give a fully dark picture.

In case the level 3 of the electrolyte is below the cone 12—either at the cylindrical portion 13 or below the said cylindrical portion 13—the cone 12 will reflect the incoming light and give a picture of a brilliant disc shaped surface having a black spot at the center. The black spot is caused by the cylindrical portion 13 which will not reflect light—whether it is immersed in liquid or not.

Distilled water may be supplied through the opening 8 and the channel leading therefrom to the interior of the cell while a corresponding amount of air may escape through the other channel having the opening 7. During the filling the picture of the black spot will increase and as soon as the brilliant surface has disappeared the level 3 has obtained its correct value.

The frustro-conical protrusion 14 of the vent plug provides a convenient fitting for friction coupling of a flexible hose (not shown) to be used in filling the cell.

What is claimed is:

1. A removable vent plug for filling an opening of a cell of an electric storage battery containing liquid electrolyte comprising in combination, an indicator for displaying exterior to the cell the level of electrolyte in the cell, housing means through which the indicator extends for attaching said vent plug in the opening of said cell, said housing means and indicator forming two separate channels in the vent plug each with openings leading from the interior of the cell, a cover positioned on said housing means and provided with two openings, one of said openings in the cover leading into one of said channels to permit addition of electrolyte to the cell without removing the vent plug while viewing the electrolyte level on said indicator and the other opening in said cover leading into the other channel to permit unrestricted passage of air from the interior of the cell as said electrolyte is added.

* * * * *